US011248903B2

(12) United States Patent
Cho et al.

(10) Patent No.: US 11,248,903 B2
(45) Date of Patent: Feb. 15, 2022

(54) THREE-DIMENSION MEASUREMENT DEVICE AND OPERATION METHOD THEREOF

(71) Applicant: Industrial Technology Research Institute, Hsinchu (TW)

(72) Inventors: Chia-Hung Cho, Hsinchu (TW); Po-Yi Chang, Taichung (TW); Yi-Sha Ku, Hsinchu (TW); Kai-Ping Chuang, Zhubei (TW); Chih-Hsiang Liu, Xinpu Township (TW); Fu-Cheng Yang, Xinpu Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 145 days.

(21) Appl. No.: 16/717,425

(22) Filed: Dec. 17, 2019

(65) Prior Publication Data
US 2021/0080252 A1 Mar. 18, 2021

(30) Foreign Application Priority Data
Sep. 18, 2019 (TW) ................ 108133526

(51) Int. Cl.
*G01B 11/25* (2006.01)
*G06K 9/32* (2006.01)
*G06T 7/521* (2017.01)

(52) U.S. Cl.
CPC ...... *G01B 11/2522* (2013.01); *G01B 11/2513* (2013.01); *G06K 9/3233* (2013.01); *G06T 7/521* (2017.01)

(58) Field of Classification Search
CPC ............ G01B 11/2513; G01B 11/2522; G06K 9/3233; G06T 7/521
See application file for complete search history.

(56) References Cited

U.S. PATENT DOCUMENTS

| 5,646,733 A | 7/1997 | Bieman |
| 7,587,094 B2 | 9/2009 | Fujiwara et al. |

(Continued)

FOREIGN PATENT DOCUMENTS

| CN | 1508514 A | 6/2004 |
| CN | 1945204 A | 4/2007 |

(Continued)

OTHER PUBLICATIONS

Edmund Optics, "7 Big Ideas To Understanding Imaging Systems", 2014, pp. 1-38. (Year: 2014).*

(Continued)

*Primary Examiner* — Rebecca C Bryant
*Assistant Examiner* — Amanda Merlino
(74) *Attorney, Agent, or Firm* — Birch, Stewart, Kolasch & Birch, LLP

(57) ABSTRACT

A three-dimension measurement device includes a moving device, a projecting device, a surface-type image-capturing device and a processing device. The moving device carries an object, and moves the object to a plurality of positions. The projecting device generates a first light to the object. The surface-type image-capturing device senses a second light generated by the object in response to the first light to generate a phase image on each of the positions. The processing device is coupled to the surface-type image-capturing device and receives the phase images. The processing device performs a region-of-interest (ROI) operation for the phase images to generate a plurality of ROI images. The processing device performs a multi-step phase-shifting operation for the ROI images to calculate the surface height distribution of the object.

16 Claims, 8 Drawing Sheets

(56) References Cited

U.S. PATENT DOCUMENTS

| | | | |
|---|---|---|---|
| 7,684,052 | B2 | 3/2010 | Suwa et al. |
| 9,163,936 | B1 | 10/2015 | Ulmer et al. |
| 9,756,314 | B2 | 9/2017 | Shimodaira |
| 2015/0204660 | A1* | 7/2015 | Ishihara ............. G01B 11/2527 348/135 |
| 2018/0130233 | A1* | 5/2018 | Deck ........................ G06T 7/80 |
| 2020/0072599 | A1* | 3/2020 | Van Dam ........... G01B 11/2513 |

FOREIGN PATENT DOCUMENTS

| | | |
|---|---|---|
| CN | 104508423 A | 4/2015 |
| CN | 106546193 A | 3/2017 |
| CN | 108332684 A | 7/2018 |
| TW | 580556 B | 3/2004 |
| TW | I575219 B | 3/2017 |
| TW | I604411 B | 11/2017 |
| WO | WO 2015/131944 A1 | 9/2015 |

OTHER PUBLICATIONS

Taiwanese Office Action and Search Report for Taiwanese Application No. 108133526, dated Dec. 7, 2020.
Yoneyama et al., "Scanning moire and spatial-offset phase-stepping for surface inspection of structures", Optics and Lasers in Engineering, vol. 43, 2005, pp. 659-670.

* cited by examiner

```
┌─────────────────────────────────────────┐
│ Generating the first light to the object according
│ to a light-adjustment condition, wherein the
│ light-adjustment condition is adjusted according
│ to the pixel size of the line-type image-capturing
│    device, the pixel pitch of the line-type          │— S602
│ image-capturing device, the lens magnification
│ of the line-type image-capturing device, the lens
│ magnification of the projecting device, and the
│ angle between the first light and the second light
└─────────────────────────────────────────┘
                      ↓
┌─────────────────────────────────────────┐
│   Moving the object to a plurality of positions    │— S604
└─────────────────────────────────────────┘
                      ↓
┌─────────────────────────────────────────┐
│   Sensing a second light generated by the object
│   in response to the first light to generate a phase │— S606
│         image on each of the positions
└─────────────────────────────────────────┘
                      ↓
┌─────────────────────────────────────────┐
│    Receiving the phase images, performing a
│   region-of-interest (ROI) operation for the phase
│   images to generate a plurality of ROI images
│      and performing a multi-step phase-shifting      │— S608
│     operation for the ROI images to calculate the
│       surface height distribution of the object
└─────────────────────────────────────────┘
```

FIG. 6

THREE-DIMENSION MEASUREMENT DEVICE AND OPERATION METHOD THEREOF

CROSS-REFERENCE TO RELATED APPLICATION

The present application is based on, and claims priority from, Taiwan Application Serial Number 108133526, filed Sep. 18, 2019, the disclosure of which is hereby incorporated by reference herein in its entirety.

TECHNICAL FIELD

The present disclosure relates to a three-dimension measurement device and an operation method thereof.

BACKGROUND

Technology has developed and evolved. This has led to miniaturized processing technology for semiconductors, the main purpose of which is to shorten circuits and simultaneously increase the density of transistors. In the process of the component stacking, a large number of micro bumps serve as contact points for the electrical signals to be conducted in the upper layer and lower layer. If the micro bumps are too large or too small, the signal transmission of the back-end electronic components will be poor. Accordingly, the detection of the height of the micro bumps is very important. Currently, the height of the micro bumps has decreased from hundreds of micrometers to tens of micrometers, and the height may be lowered further in the future.

However, since the measurement speed of the current measurement technology is slower and a phase error is generated in the measurement process, affecting the accuracy of the measurement, it may be difficult to achieve effective detection. Therefore, how to effectively decrease the influence of the phase error and increase the accuracy and the speed of the measurement has become a focus for technical improvements by various manufacturers.

SUMMARY

The present disclosure provides a three-dimension measurement device, which includes a moving device, a projecting device, a surface-type image-capturing device and a processing device. The moving device is configured to carry an object, and move the object to a plurality of positions. The projecting device is configured to generate a first light to the object. The surface-type image-capturing device is configured to sense a second light generated by the object in response to the first light to generate a phase image on each of the positions. The processing device is coupled to the surface-type image-capturing device. The processing device is configured to receive the phase images, perform a region-of-interest (ROI) operation for the phase images to generate a plurality of ROI images and perform a multi-step phase-shifting operation for the ROI images to calculate the surface height distribution of the object.

In addition, the present disclosure provides a three-dimension measurement device, which includes a moving device, a projecting device, a line-type image-capturing device and a processing device. The moving device is configured to carry an object, and move the object to a plurality of positions. The projecting device is configured to generate a first light to the object according to a light-adjustment condition. The line-type image-capturing device is configured to sense a second light generated by the object in response to the first light to generate a phase image on each of the positions. The processing device is coupled to the line-type image-capturing device. The processing device is configured to receive the phase images, perform a region-of-interest (ROI) operation for the phase images to generate a plurality of ROI images and perform a multi-step phase-shifting operation for the ROI images to calculate the surface height distribution of the object. The light-adjustment condition is adjusted according to the pixel size of the line-type image-capturing device, the pixel pitch of the line-type image-capturing device, the lens magnification of the line-type image-capturing device, the lens magnification of the projecting device, and the angle between the first light and the second light.

In addition, the present disclosure provides an operation method of a three-dimension measurement device, which includes the following steps. A first light is generated to an object. The object is moved to a plurality of positions. A second light generated by the object in response to the first light is sensed to generate a phase image on each of the positions. The phase images are received, a region-of-interest (ROI) operation is performed for the phase images to generate a plurality of ROI images and a multi-step phase-shifting operation is performed for the ROI images to calculate the surface height distribution of the object.

BRIEF DESCRIPTION OF DRAWINGS

The present disclosure may be more fully understood by reading the subsequent detailed description and examples with references made to the accompanying drawings, wherein:

FIG. 6 is a flowchart of an operation method of a three-dimension measurement device according to another embodiment of the present disclosure.

DETAILED DESCRIPTION OF DISCLOSED EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or similar element or component.

Figure 1A:
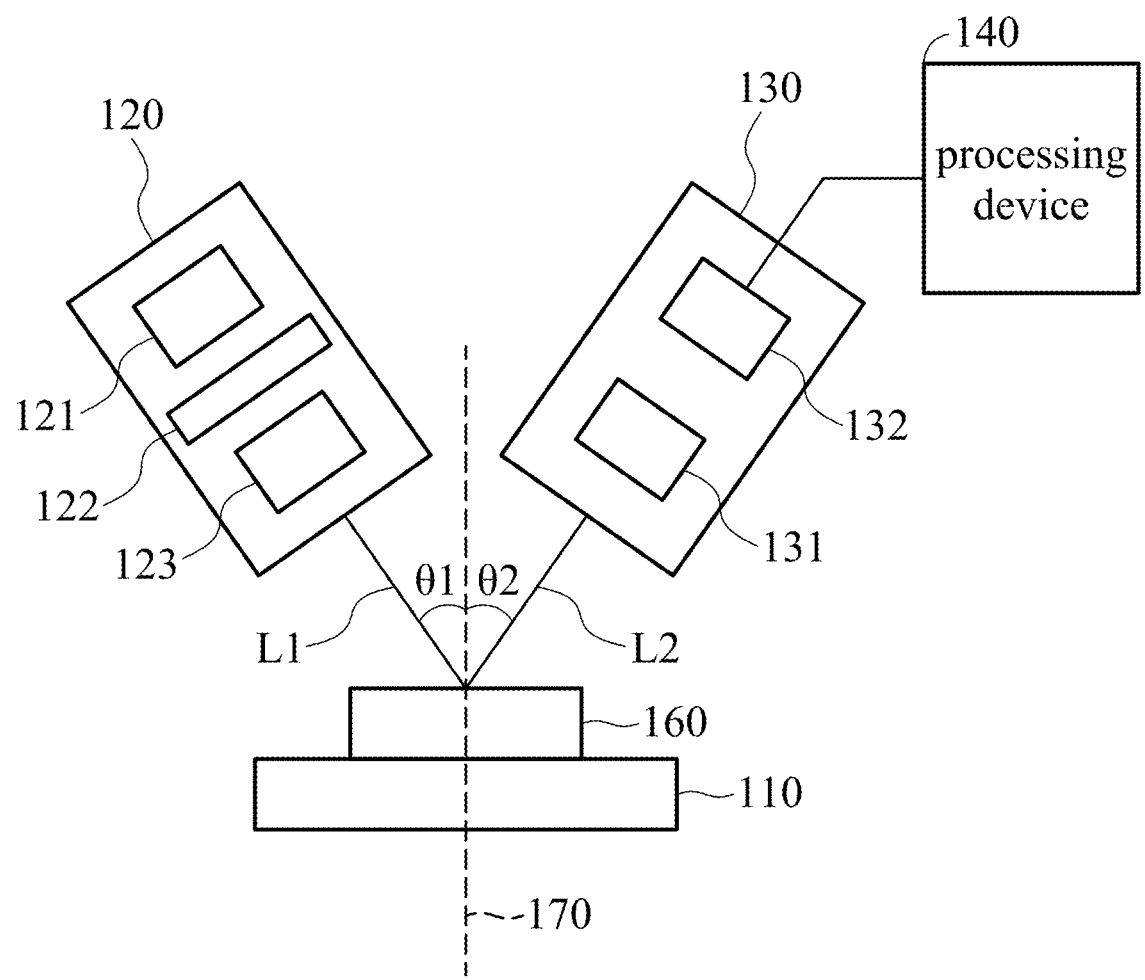
FIG. 1A is a schematic view of a three-dimension measurement device according to an embodiment of the present disclosure.
Figure 1B:
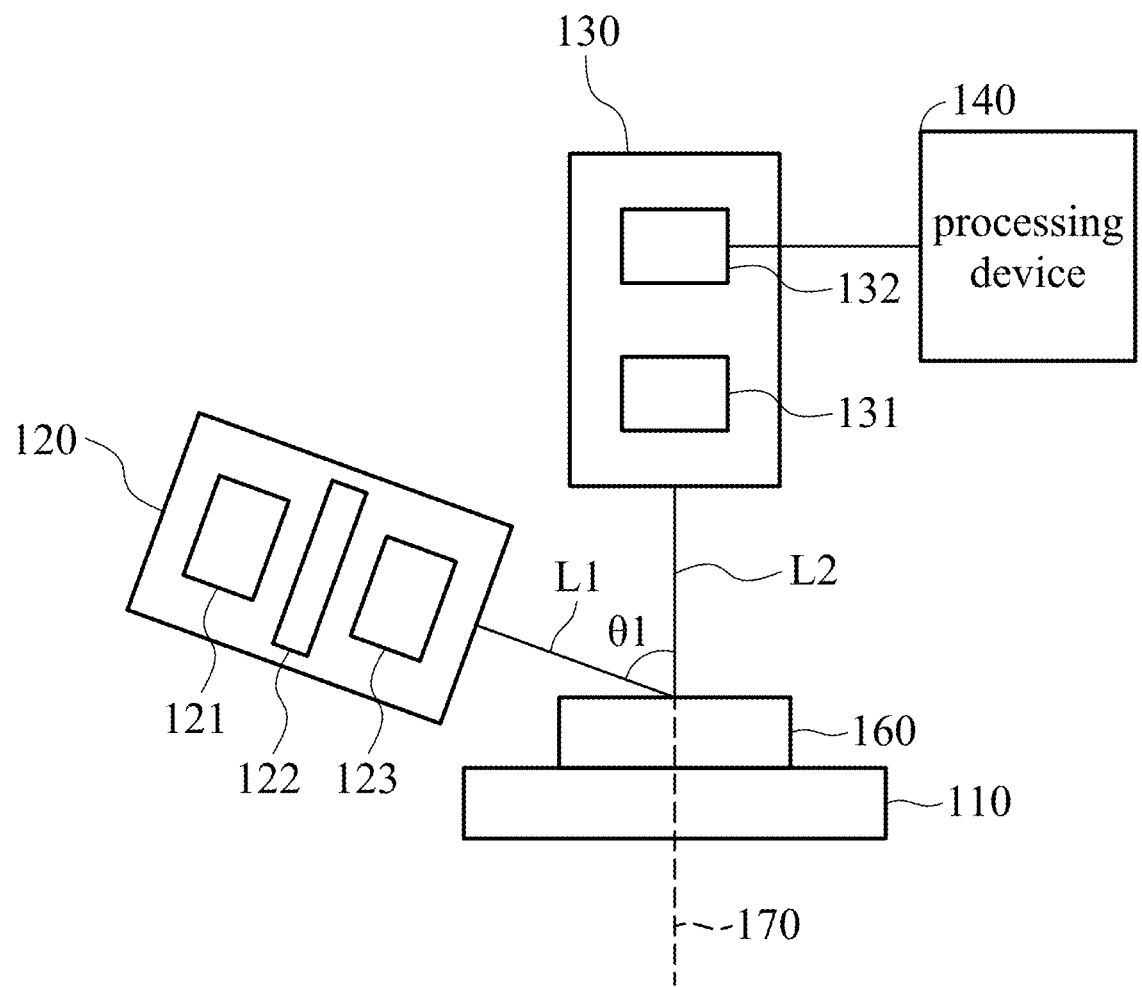
FIG. 1B is a schematic view of a three-dimension measurement device according to another embodiment of the present disclosure.

FIG. 1A is a schematic view of a three-dimension measurement device according to an embodiment of the present disclosure. FIG. 1B is a schematic view of a three-dimension measurement device according to another embodiment of the present disclosure Please refer to FIG. 1A and FIG. 1B. The three-dimension measurement device 100 includes a moving device 110, a projecting device 120, a surface-type image-capturing device 130 and a processing device 140.

Figure 2A:
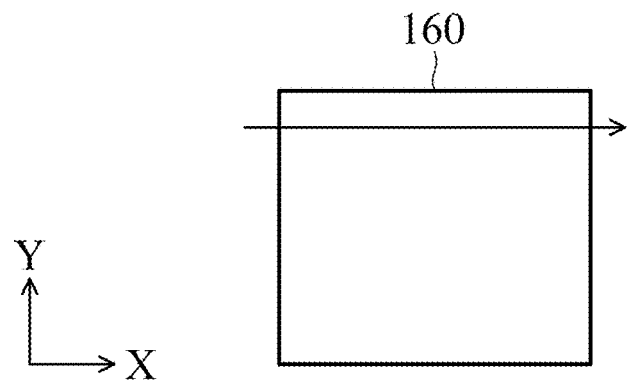
FIGS. 2A, 2B and 2C are schematic views of a moving device moving an object according to an embodiment of the present disclosure.
Figure 2B:
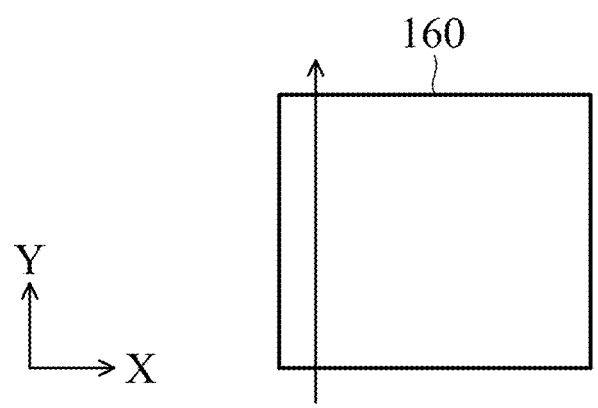
Figure 2C:
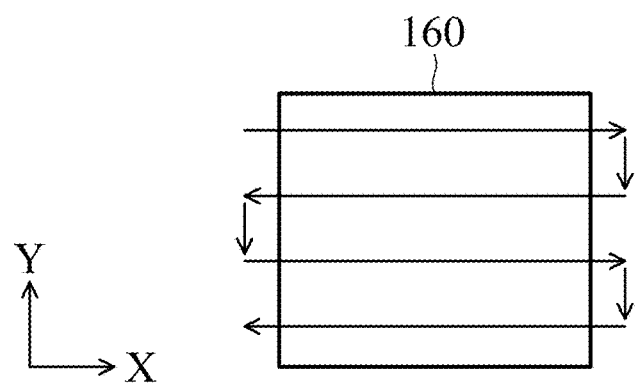

The moving device 110 may carry an object 160 and moves the object 160, i.e., the moving device 110 may move the object 160 to a plurality of different positions. In an embodiment, the moving device 110 may be a single-axis moving device. For example, the moving device 110 may move the object 160 on the X-axis, as shown in FIG. 2. Alternatively, the moving device 110 may move the object 160 on the Y-axis, as shown in FIG. 2B. In other embodiment, the moving device 110 may be a multi-axis moving device. For example, the moving device 110 may move the object on the X-axis and Y-axis, as shown in FIG. 2C.

The projecting device 120 is configured to generate a first light L1 to the object 160. In the embodiment, the projecting device 120 may include a light source 121, a light modulation unit 122 and a projecting lens 123. The light source 121 is configured to generate a light, wherein the light generated by the light source 121 may be a visible light or an invisible light. Furthermore, the light generated by the light source 121 may be a broadband white light, a narrow wave blue light or an infrared light. The light modulation unit 122 may change the light pattern of the light generated by the light source 121. In the embodiment, the light modulation unit 122 is, for example, a microarray lens, a light crystal on silicon (LCOS), a grating, etc. The projecting lens 123 has a lens magnification, and magnifies the above light pattern according to the lens magnification to generate the first light L1 for projecting to the object 160.

Figure 3:
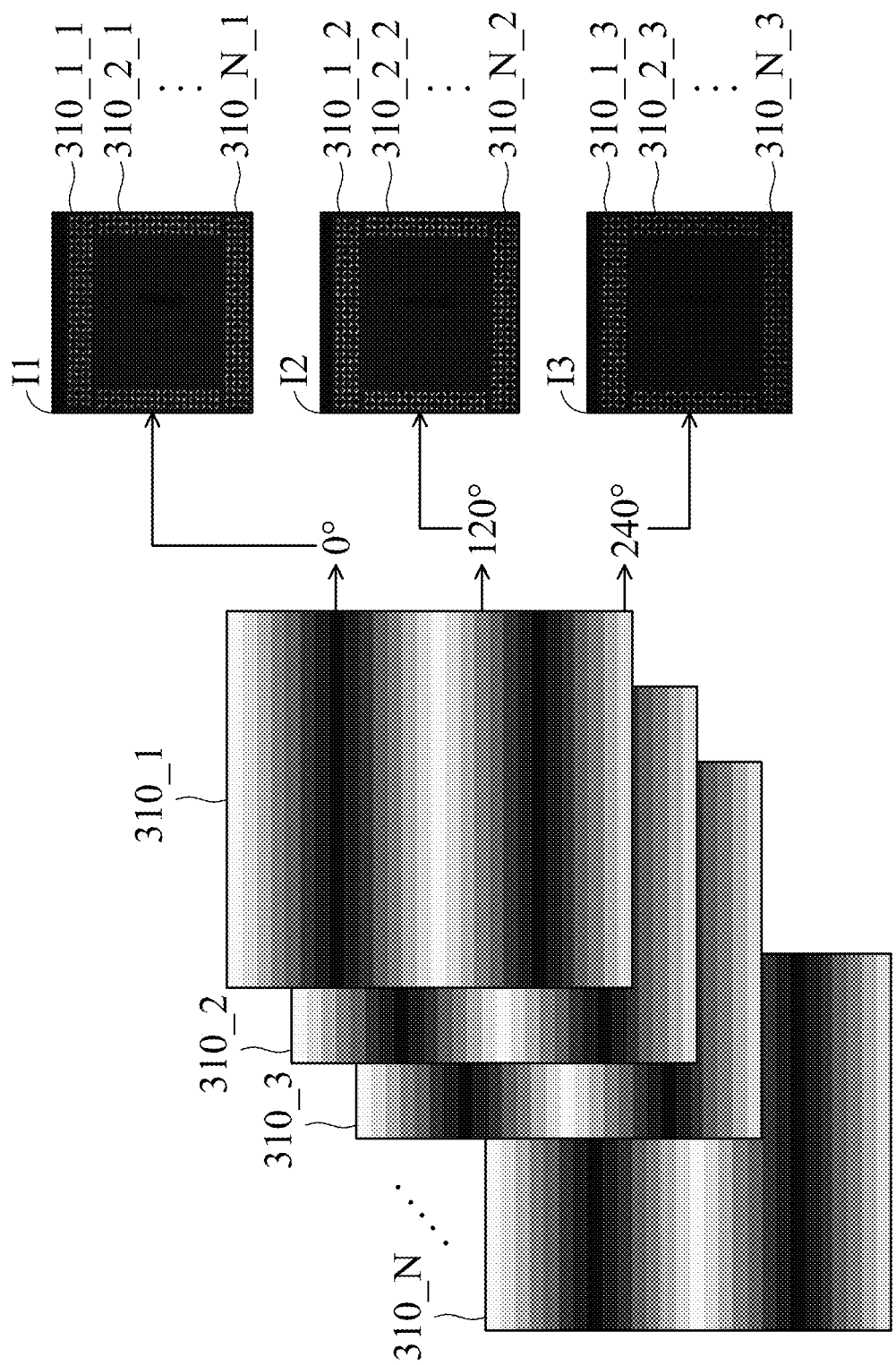
FIG. 3 is a schematic view of a corresponding relationship of phase images obtained by a surface-type image-capturing device and region-of-interest images according to an embodiment of the present disclosure.

The surface-type image-capturing device 130 is configured to sense a second light L2 generated by the object 160 in response to the first light L1 to generate a phase image 310_1~310_N on each of the positions, as shown in FIG. 3. In the embodiment, N is a positive integer greater than 1. In addition, the phase images 310_1~310_N correspond to different respective positions. For example, the phase image 310_1 is a phase image generated by the surface-type image-capturing device 130 when the object 160 is on the position 1. The phase image 310_2 is a phase image generated by the surface-type image-capturing device 130 when the object 160 is on the position 2. The rest of the pulse images are similar, and their operation may be discerned by analogy. In the embodiment, the surface-type image-capturing device 130 may include an image-capturing lens 131 and an image-capturing unit 132.

The image-capturing lens 131 has a lens magnification, and magnifies the above light L2 according to the lens magnification. The image-capturing unit 132 receives and senses the second light L2 through the image-capturing lens 131 to generate the corresponding phase images 310_1~310_N. In the embodiment, the image-capturing unit 132 is, for example, a charge coupled device (CCD).

The processing device 140 is coupled to the surface-type image-capturing device 130. In the embodiment, the processing device 140 may be a micro-controller, a microprocessor, other computing devices with data processing function, etc. The processing device 140 receives the phase images 310_1~310_N generated by the surface-type image-capturing device 130. Then, the processing device 140 performs a region-of-interest (ROI) operation for the above phase images 310_1~310_N to generate a plurality of ROI images I1, I2 and I3.

For example, the processing device 140 captures images in the phase images 310_1~310_N corresponding to angles of 0 degrees, 120 degrees and 240 degrees through the ROI operation to obtain the phase images 310_1_1~310_N_1 corresponding to 0 degrees, the phase images 310_1_2~310_N_2 corresponding to 120 degrees and the phase images 310_1_3~310_N_3 corresponding to 240 degrees.

Then, the processing device 140 sequentially arranges the phase images 310_1_1~310_N_1 corresponding to 0 degrees to generate the ROI image I1 corresponding to 0 degrees. The processing device 140 sequentially arranges the phase images 310_1_2~310_N_2 corresponding to 120 degrees to generate the ROI image I2 corresponding to 120 degrees. The processing device 140 sequentially arranges the phase images 310_1_3~310_N_3 corresponding to 240 degrees to generate the ROI image I3 corresponding to 240 degrees.

Afterward, the processing device 140 performs a three-step phase-shifting operation for the ROI images I1, I2, I3 to calculate the surface height distribution of the object 160, i.e., the processing device 140 calculates the height of each of the bumps on the surface of the object 160. In the embodiment, the three-step phase-shifting operation satisfies the following formula (1):

$$\phi(x, y) = \tan^{-1}\left(\frac{\sqrt{3}(I_1 - I_3)}{2I_2 - (I_1 + I_3)}\right), \quad (1)$$

wherein $\Phi(x,y)$ is the height of each of the bumps on the surface of the object 160, $I_1$ is the ROI image correspond to 0 degrees, $I_2$ is the ROI image corresponding to 120 degrees, and $I_3$ is the ROI image corresponding to 240 degrees.

In the embodiment, the angle of the phase angle (such as 0 degrees, 120 degrees and 240 degrees) corresponding to the ROI images I1~I3 are one exemplary embodiment of the present disclosure, but the present disclosure is not limited thereto. The user may adjust the angles of the phase angles corresponding to the ROI images I1~I3 according to the requirements thereof. For example, the difference between the phase angles corresponding to the ROI images I1 and I2 is the same as the difference between the phase angles corresponding to the ROI images I2 and I3.

For example, in some embodiments, the ROI image I1 may correspond to a phase angle of 0 degrees, the ROI image I2 may correspond to a phase angle of 130 degrees, and the ROI image I3 may correspond to a phase angle of 260 degrees. In some embodiments, the ROI image I1 may correspond to a phase angle of 0 degrees, the ROI image I2 may correspond to a phase angle of 90 degrees, and the ROI image I3 may correspond to a phase angle of 180 degrees.

In the above embodiment, the processing device 140 uses, for example, the three-step phase-shifting operation for the purpose of description, but the present disclosure is not limited thereto. Other embodiments are provided below to illustrate other operations of the processing device 140. That is, the processing device 140 obtains a different number of ROI images, and performs another corresponding multi-step phase-shifting operation for the ROI images to calculate surface height distribution of the object 160.

In some embodiments, after the processing device 140 receives the phase images 310_1~310_N generated by the surface-type image-capturing device 130, the processing device 140 performs the ROI operation for the above phase images 310_1~310_N to generate, for example, a plurality of ROI images I1, I2, I3 and I4.

For example, the processing device 140 captures images in the phase images 310_1~310_N corresponding to angles of 0 degrees, 90 degrees, 180 degrees and 270 degrees through the ROI operation to obtain the phase images 310_1_1~310_N_1 corresponding to 0 degrees, the phase images 310_1_2~310_N_2 corresponding to 90 degrees, the phase images 310_1_3~310_N_3 corresponding to 180 degrees, and the phase images 310_1_~310_N_4 corresponding to 270 degrees.

Then, the processing device 140 sequentially arranges the phase images 310_1_1~310_N_1 corresponding to 0 degrees to generate the ROI image I1 corresponding to 0 degrees. The processing device 140 sequentially arranges the phase images 310_1_2~310_N_2 corresponding to 90 degrees to generate the ROI image I2 corresponding to 90 degrees. The processing device 140 sequentially arranges the phase images 310_1_3~310_N_3 corresponding to 180 degrees to generate the ROI image I3 corresponding to 180 degrees. The processing device 140 sequentially arranges the phase images 310_1_~310_N_4 corresponding to 270 degrees to generate the ROI image I4 corresponding to 270 degrees. In addition, in the embodiment, the manner of generating the ROI images I1, I2, I3 and I4 may refer the description of the embodiment in FIG. 3, and the description thereof is not repeated herein.

Afterward, the processing device 140 performs a four-step phase-shifting operation for the ROI images I1, I2, I3 and I4 to calculate the surface height distribution of the object 160, i.e., the processing device 140 calculates the height of each of the bumps on the surface of the object 160. In the embodiment, the four-step phase-shifting operation satisfies the following formula (2):

$$\phi(x, y) = \tan^{-1}\left(\frac{I_4 - I_2}{I_1 - I_3}\right), \qquad (2)$$

wherein, $\Phi(x,y)$ is the height of each of the bumps on the surface of the object 160, $I_1$ is the ROI image corresponding to 0 degrees, $I_2$ is the ROI image corresponding to 90 degrees, $I_3$ is the ROI image corresponding to 180 degrees and $I_4$ is the ROI image corresponding to 270 degrees.

In the embodiment, the angle of the phase angle (such as 0 degrees, 90 degrees, 180 degrees and 270 degrees) corresponding to the ROI images I1~I4 are one exemplary embodiment of the present disclosure, but the present disclosure is not limited thereto. The user may adjust the angles of the phase angles corresponding to the ROI images I1~I4 according to the requirements thereof. For example, the difference between the phase angles corresponding to the ROI images I1 and I2 is the same as the difference between the phase angles corresponding to the ROI images I2 and I3, and the difference between the phase angles corresponding to the ROI images I2 and I3 is the same as the difference between the phase angles corresponding to the ROI images I3 and I4.

For example, the ROI image I1 may correspond to a phase angle of 0 degrees, the ROI image I2 may correspond to a phase angle of 45 degrees, the ROI image I3 may correspond to a phase angle of 90 degrees, the ROI image I4 may correspond to 135 degrees. In some embodiments, the ROI image I1 may correspond to a phase angle of 0 degrees, the ROI image I2 may correspond to a phase angle of 60 degrees, the ROI image I3 may correspond to a phase angle of 120 degrees, and the ROI image I4 may correspond to a phase angle of 180 degrees.

In some embodiments, after the processing device 140 receives the phase images 310_1~310_N generated by the surface-type image-capturing device 130, the processing device 140 performs the ROI operation for the above phase images 310_1~310_N to generate, for example, a plurality of ROI images I1, I2, I3, I4 and I5.

For example, the processing device 140 captures images in the phase images 310_1~310_N corresponding to angles of 0 degrees, 90 degrees, 180 degrees, 270 degrees and 360 degrees through the ROI operation to obtain the phase images 310_1_1~310_N_1 corresponding to 0 degrees, the phase images 310_1_2~310_N_2 corresponding to 90 degrees, the phase images 310_1_3~310_N_3 corresponding to 180 degrees, the phase images 310_1_~310_N_4 corresponding to 270 degrees, and the phase images 310_1_5~310_N_5 corresponding to 360 degrees.

Then, the processing device 140 sequentially arranges the phase images 310_1_1~310_N_1 corresponding to 0 degrees to generate the ROI image corresponding to 0 degrees. The processing device 140 sequentially arranges the phase images 310_1_2~310_N_2 corresponding to 90 degrees to generate the ROI image I2 corresponding to 90 degrees. The processing device 140 sequentially arranges the phase images 310_1_3~310_N_3 corresponding to 180 degrees to generate the ROI image I3 corresponding to 180 degrees.

The processing device 140 sequentially arranges the phase images 310_1_~310_N_4 corresponding to 270 degrees to generate the ROI image I4 corresponding to 270 degrees. The processing device 140 sequentially arranges the phase images 310_1_~310_N_4 corresponding to 360 degrees to generate the ROI image I5 corresponding to 360 degrees. In addition, in the embodiment, the manner of generating the ROI images I1, I2, I3, I4 and I5 may refer the description of the embodiment in FIG. 3, and the description thereof is not repeated herein.

Afterward, the processing device 140 performs a five-step phase-shifting operation for the ROI images I1, I2, I3, I4 and I5 to calculate the surface height distribution of the object 160, i.e., the processing device 140 calculates the height of each of the bumps on the surface of the object 160. In the embodiment, the five-step phase-shifting operation satisfies the following formula (3):

$$\phi(x, y) = \tan^{-1}\left(\frac{2(I_2 - I_4)}{2I_3 - I_5 - I_1}\right), \qquad (3)$$

wherein $\Phi(x,y)$ is the height of each of the bumps on the surface of the object 160, $I_1$ is the ROI image corresponding to 0 degrees, $I_2$ is the ROI image corresponding to 90 degrees, $I_3$ is the ROI image corresponding to 180 degrees, I4 is the ROI image corresponding to 270 degrees, and I5 is the ROI image corresponding to 360 degrees.

In the embodiment, the angle of the phase angle (such as 0 degrees, 90 degrees, 180 degrees, 270 degrees and 360 degrees) corresponding to the ROI images I1~I5 are one exemplary embodiment of the present disclosure, but the present disclosure is not limited thereto. The user may adjust the angles of the phase angles corresponding to the ROI images I1~I5 according to the requirements thereof. For example, the difference between the phase angles corresponding to the ROI images I1 and I2 is the same as the difference between the phase angles corresponding to the ROI images I2 and I3, the difference between the phase angles corresponding to the ROI images I2 and I3 is the same as the difference between the phase angles corresponding to the ROI images I3 and I4, and the difference between the phase angles corresponding to the ROI images I3 and I4 is the same as the difference between the phase angles corresponding to the ROI images I4 and I5.

For example, in some embodiments, the ROI image I1 may correspond to a phase angle of 0 degrees, the ROI image I2 may correspond to a phase angle of 45 degrees, the ROI image I3 may correspond to 90 degrees, the ROI image I4 may correspond to 135 degrees, and the ROI image I5 may correspond to 180 degrees. In some embodiments, the ROI image I1 may correspond to a phase angle of 0 degrees, the ROI image I2 may correspond to a phase angle of 60 degrees, the ROI image I3 may correspond to the phase image of 120 degrees, the ROI image I4 may correspond to a phase angle of 180 degrees, and the ROI image I5 may correspond to a phase angle of 240 degrees.

According to the description of the above embodiment, in the embodiment of the present disclosure, the processing device 140 processes the phase image obtained by the surface-type image-capturing device 130 to generate the ROI images, and performs the multi-step phase-shifting for the ROI images to generate surface height distribution of the object 160. Therefore, the influence of the phase error may be effectively decreased, and the accuracy and the speed of measuring the surface height distribution of the object 160 are increased.

In addition, when the object 160 is a specular object (such as a wafer), an angle θ1 of the first light L1 is equal to an angle θ2 of the second light L2 (as shown in FIG. 1A), wherein the first light L1 is an incident light, the second light L2 is a reflected light, the angle θ1 is an angle between the first light L1 and a normal line 170, and the angle θ2 is an angle between the second light L2 and the normal line 170. That is, the three-dimension measurement device 100 may measure the height of the bump of the surface of the wafer.

In another embodiment, when the object 160 is a non-specular object (such as a printed circuit board (PCB)), the angle θ1 of the first light L1 is not equal to the angle θ2 of the second light L2 (not shown, since the second light L2 overlaps the normal line 170, θ2=0 degree) (as shown in FIG. 1B), wherein the first light L1 is an incident light, and the second light L2 is a scattered light. That is, the three-dimension measurement device 100 may measure the height of the bump of the surface of the printed circuit board.

Furthermore, the manner of the angle θ1 of the first light L1 not equal to the angle θ2 of the second light L2 as shown in FIG. 1B is one exemplary embodiment of the present disclosure, but the embodiment of the present disclosure is not limited thereto. The user may adjust the positions of the projecting device 120 and the surface-type image-capturing device 130, so that the angle θ1 of the first light L1 is not equal to the angle θ2 of the second light L2. Accordingly, the same effect may be achieved.

In an embodiment, a distance that the moving device 110 moves the object 160 each time is associated with the pixel size and a lens magnification of the surface-type image-capturing device 130. Furthermore, the above distance is, for example, the pixel size divided by the lens magnification. For example, assuming that the pixel size is 10 um and the lens magnification is 2 times, the above distance is 5 um. That is, the distance that the moving device 110 moves the object 160 each time is 5 um. Assuming that the pixel size is 20 um and the lens magnification is 2 times, the above distance is 10 um. That is, the distance that the moving device 110 moves the object 160 each time is 10 um. The other distances that the moving device 110 moves the object 160 is similar to, and may be understood by analogy by making reference to, the above description, and the description thereof is not repeated herein.

In an embodiment, the number of phase images 310_1~310_N is associated with the size of the object 160. For example, assuming that the size of the object 160 is 45 um and the distance that the moving device 110 moves the object 160 is 5 um, the total number of times that the moving device 110 moves the object 160 is 9 times (45/5=9) and the number of above phase image 310_1~310_N is nine phase images.

Assuming that the size of the object 160 is 100 um and the distance that the moving device 110 moves the object 160 is 5 um, the total number of times that the moving device 110 moves the object 160 is 20 times (100/5=20), and the number of above phase images 310_1~310_N is 20 phase images. A relationship of the number of other phase images associated with the size of the object 160 is similar to, and may be understood by analogy by making reference to, the above description, and the description thereof is not repeated herein.

In the above embodiment, the distance that the moving device 110 moves the object 160 each time is a fixed distance (such as 5 um). That is, the moving device 110 moves the object 160 point by point, so that the three-dimension measurement device 100 scans the object 160 point by point to scan all three-dimension features of the object 160. However, the present disclosure is not limited thereto. The distance that the moving device 110 moves the object 160 each time may be a fixed distance or a non-fixed distance. That is, the moving device 110 moves the object 160 by a jump point manner, so that the three-dimension measurement device 100 scans the object 160 by the jump point manner to scan the height of the particular points of the object 160.

For example, the distance that the moving device 110 moves the object 160 is 5 um, 10 um, 15 um, 10 um, 5 um, etc. in sequence. In addition, the distance that the moving device 110 moves the object 160 is 5 um, 5 um, 10 um, 10 um, 5 um, etc. in sequence. Furthermore, the distance that the moving device 110 moves the object 160 is 5 um, 10 um, 5 um, 10 um, 5 um, etc. in sequence. The moving manner of other distances is similar to, and may be understood by analogy by making reference to, the above description, and the description thereof is not repeated herein.

Figure 4A:
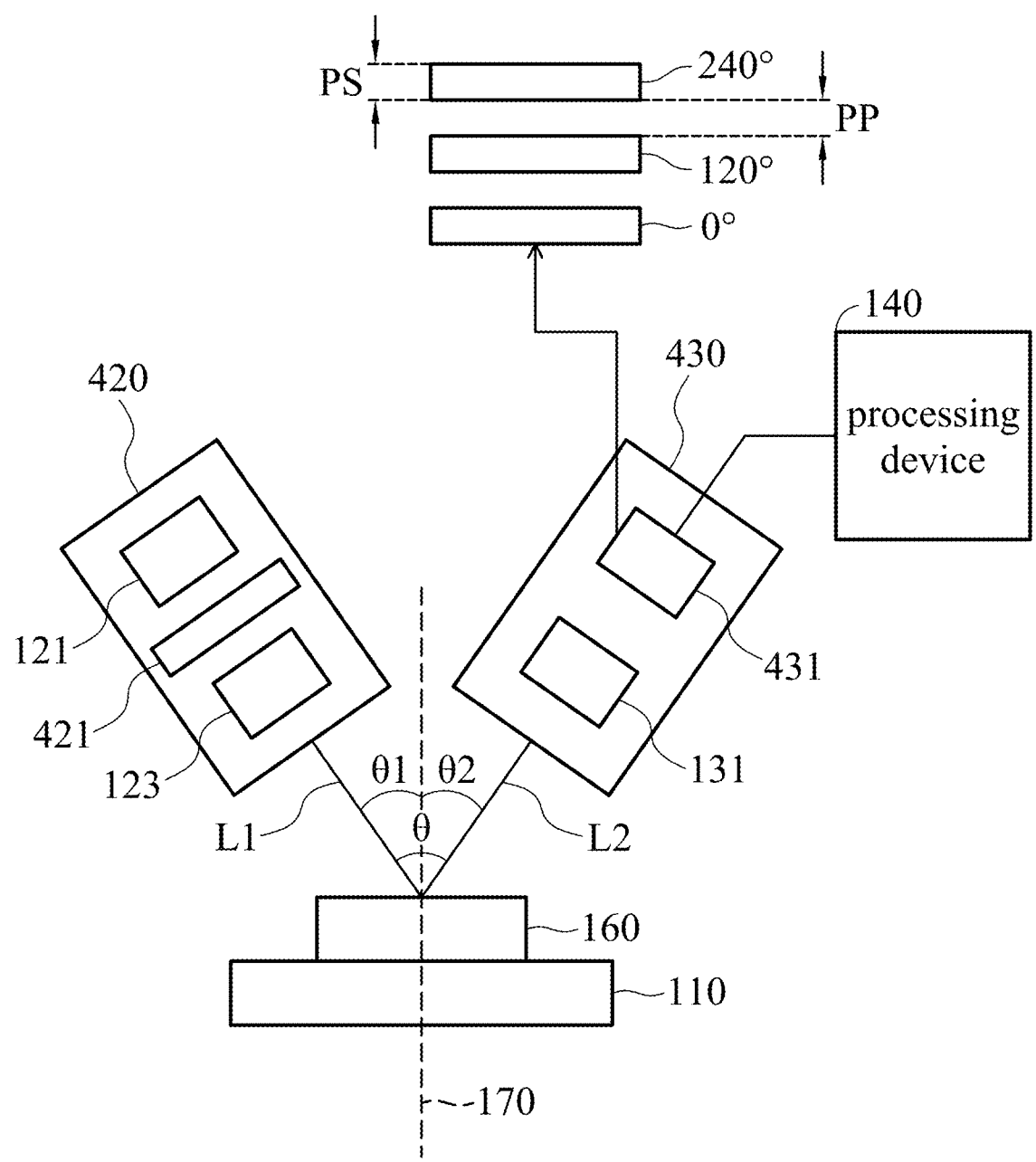
FIG. 4A is a schematic view of a three-dimension measurement device according to another embodiment of the present disclosure.
Figure 4B:
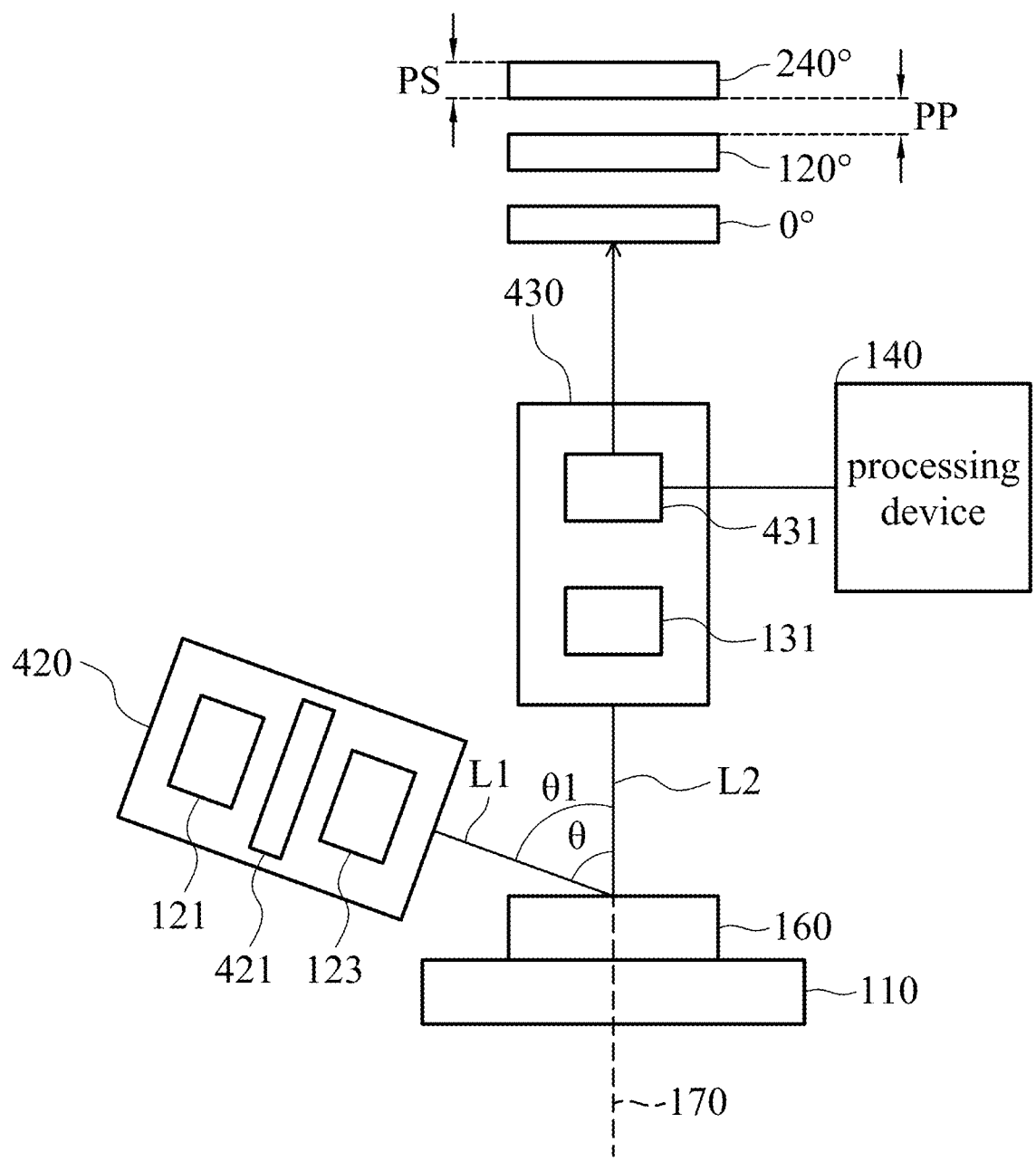
FIG. 4B is a schematic view of a three-dimension measurement device according to another embodiment of the present disclosure.

FIG. 4A is a schematic view of a three-dimension measurement device according to another embodiment of the present disclosure. FIG. 4B is a schematic view of a three-dimension measurement device according to another embodiment of the present disclosure. Please refer to FIG. 4A and FIG. 4B. The three-dimension measurement device 400 includes a moving device 110, a projecting device 420, a line-type image-capturing device 430 and a processing device 140. In the embodiment, the moving device 110 and the processing device 140 in FIGS. 4A and 4B are equal to or similar to the moving device 110 and the processing device 140 in FIGS. 1A and 1B. Accordingly, the moving device 110 and the processing device 140 in FIGS. 4A and 4B is similar to, and may be understood by analogy by making reference to, the description of the embodiments of FIGS. 1A and 1B, and the description thereof is not repeated herein.

The projecting device 420 is configured to generate a first light L1 to the object 160 according to a light-adjustment condition. In the embodiment, the projecting device 420 may include a light source 121, a light modulation unit 421 and a projecting lens 123. The light source 121 and the projecting lens 123 in FIGS. 4A and 4B are equal to or similar to the light source 121 and the projecting lens 123 in FIGS. 1A and 1B. Accordingly, light source 121 and the projecting lens 123 in FIGS. 4A and 4B is similar to, and may be understood by analogy by making reference to, the description of the embodiments of FIGS. 1A and 1B, and the description thereof is not repeated herein.

The line-type image-capturing device 430 is configured to sense a second light L2 generated by the object 160 in response to the first light L1 to generate a phase image 310_1~310_N on each of the positions, as shown in FIG. 3. In addition, the phase images 310_1~310_N correspond to different respective positions. For example, the phase image 310_1 is a phase image generated by the line-type image-capturing device 430 when the object 160 is on the position 1. The phase image 310_2 is a phase image generated by the line-type image-capturing device 430 when the object 160 is on the position 2. The rest of the pulse images are similar, and their operation may be discerned by analogy. In the embodiment, the line-type image-capturing device 430 may include an image-capturing lens 131 and an image-capturing unit 431. The image-capturing lens 131 in FIGS. 4A and 4B is equal to or similar to the image-capturing lens 131 in FIGS. 1A and 1B. Accordingly, the image-capturing lens 131 in FIGS. 4A and 4B is similar to, and may be understood by analogy by making reference to, the description of the embodiments of FIGS. 1A and 1B, and the description thereof is not repeated herein.

In the embodiment, the light modulation unit 421 is also, for example, a microarray lens, a light crystal on silicon (LCOS), a grating, etc. In addition, the light modulation unit 421 may change the light pattern of the light generated by the light source 121 according to the light-adjustment condition. In the embodiment, the light-adjustment condition is adjusted according to the pixel size PS of the line-type image-capturing device 430, the pixel pitch PP of the line-type image-capturing device 430, the lens magnification of the line-type image-capturing device 430 (i.e., the lens magnification of the image-capturing lens 131), the lens magnification of the projecting device 420 (i.e., the lens magnification of the projecting lens 123), and the angle θ between the first light L1 and the second light L2.

The image-capturing unit 431 receives and senses the second light L2 to generate a plurality of corresponding phase images, such as the phase images corresponding to 0 degrees, 120 degrees and 240 degrees. In the embodiment, the image-capturing unit 431 is, for example, a multi-line charge coupled device (such as a three-line charge coupled device). In addition, the first light L1 is generated according to the light-adjustment condition, so that the second light L2 may correspond to the image-capturing phases of the image-capturing unit 431 at different angles. That is, the second light L2 may correspond to the image-capturing angles (i.e., 0 degrees, 120 degrees and 240 degrees) of the image-capturing unit 431, so that the image-capturing unit 431 may effectively generate the phase images corresponding to 0 degrees, 120 degrees and 240 degrees. Therefore, the phase error may be decreased and the accuracy of the measurement is increased.

Then, the processing device 140 may perform a region-of-interest (ROI) operation for the phase images corresponding to 0 degrees, 120 degrees and 240 degrees obtained by the line-type image-capturing device 430 to generate a plurality of ROI images I1, I2 and I3. Then, the processing device 140 performs a three-step phase-shifting operation for the ROI images to calculate the surface height distribution of the object. In addition, the manner in which the processing device 140 processes the above phase images is similar to, and may be understood by analogy by making reference to, the description of the above embodiment of FIG. 3, and the description thereof is not repeated herein.

In the above embodiment, the image-capturing unit 431 is the three-line charge coupled device, and the processing device 140 performs the three-step phase-shifting operation for the phase images generated by the image-capturing unit 431, but the embodiment of the present disclosure is not limited thereto. In addition, the image-capturing angles of the image-capturing unit 431 corresponding to the phase angles of 0 degrees, 120 degrees and 240 degrees are one exemplary embodiment of the present disclosure, but the embodiment of the present disclosure is not limited thereto. The user may also adjust the image-capturing angles of the image-capturing unit 431 according to the requirements thereof. For example, the image-capturing angle of the image-capturing unit 431 may correspond to phase angles of 0 degrees, 130 degrees and 260 degrees. In some embodiments, the image-capturing angles of the image-capturing unit 431 may correspond to phase angles of 0 degrees, 90 degrees and 180 degrees.

In some embodiments, the image-capturing unit 431 may be a four-line charge coupled device, and the processing device 140 performs the four-step phase-shifting operation for the phase images generated by the image-capturing unit 431. The four-step phase-shifting operation performed by the processing device 140 is similar to, and may be understood by analogy by making reference to, the description of the above embodiment, which is related to the four-step phase-shifting operation, and the description thereof is not repeated herein. In addition, the image-capturing angles of the image-capturing unit 431 may correspond to phase angles of 0 degrees, 90 degrees, 180 degrees and 270 degrees, but the embodiment of the present disclosure is not limited thereto. The user may also adjust the image-capturing angles of the image-capturing unit 431 according to the requirements thereof. For example, the image-capturing angles of the image-capturing unit 431 may correspond to phase angles of 0 degrees, 45 degrees, 90 degrees and 135 degrees. In some embodiments, the image-capturing angles of the image-capturing unit 431 may correspond to phase angles of 0 degrees, 60 degrees, 120 degrees and 180 degrees.

In some embodiments, the image-capturing unit 431 may also be a five-line charge coupled device, and the processing device 140 may perform the five-step phase-shifting operation for the phase images generated by the image-capturing unit 431. The five-step phase-shifting operation performed by the processing device 140 is similar to, and may be understood by analogy by making reference to, the description of the above embodiment which is related to the five-step phase-shifting operation, and the description thereof is not repeated herein. In addition, the image-capturing angles of the image-capturing unit 431 may correspond to phase angles of 0 degrees, 90 degrees, 180 degrees, 270 degrees and 360 degrees, but the embodiment of the present disclosure is not limited thereto. The user may also adjust the image-capturing angles of the image-capturing unit 431 according to the requirements thereof. For example, the image-capturing angles of the image-capturing unit 431 may correspond to phase angles of 0 degrees, 45 degrees, 90 degrees, 135 degrees and 180 degrees. In some embodiments, the image-capturing angles of the image-capturing unit 431 may correspond to phase angles of 0 degrees, 60 degrees, 120 degrees, 180 degrees and 240 degrees.

According to the description of the above embodiment, the embodiment of the present disclosure uses the projecting device 420 to generate the first light L1 according to the light-adjustment condition, so that the second L2 generated by the object 160 in response to the first light L1 may correspond to the image-capturing phases of the image-capturing unit 431 of the line-type image-capturing device 430. Then, the processing device 140 processes the phase images obtained by the line-type image-capturing device 430 to generate the ROI images, and performs the corresponding multi-step phase-shifting operation for ROI images to generate surface height distribution of the object 160. Therefore, the influence of the phase error may be effectively decreased, and the accuracy and the speed of measuring the surface height distribution of the object 160 are increased.

In addition, in an embodiment, when the object 160 is a specular object (such as a wafer), an angle θ1 of the first light L1 is equal to an angle θ2 of the second light L2 (as shown in FIG. 4A), wherein the first light L1 is an incident light, the second light L2 is a reflected light, the angle θ1 of the first light L1 is an angle between the first light L1 and a normal line 170, and the angle θ2 of the second light L2 is an angle between the second light L2 and the normal line 170. That is, the three-dimension measurement device 400 may measure the height of the bump of the surface of the wafer.

In another embodiment, when the object 160 is a non-specular object (such as a printed circuit board), the angle θ1 of the first light L1 is not equal to the angle θ2 of the second light L2 (not shown, since the second light L2 overlaps the normal line 170, the angle θ2 of the second light L2=0 degree) (as shown in FIG. 4B), wherein the first light L1 is an incident light, and the second light L2 is a scattered light. That is, the three-dimension measurement device 400 may measure the height of the bump of the surface of the printed circuit board.

Furthermore, the manner of the angle θ1 of the first light L1 not equal to the angle θ2 of the second light L2 as shown in FIG. 4B is one exemplary embodiment of the present disclosure, but the embodiment of the present disclosure is not limited thereto. The user may adjust the positions of the projecting device 420 and the line-type image-capturing device 430, so that the angle θ1 of the first light L1 is not equal to the angle θ2 of the second light L2. Accordingly, the same effect may be achieved.

In an embodiment, a distance that the moving device 110 moves the object 160 each time is associated with the pixel size and the lens magnification of the line-type image-capturing device 430. In addition, the operation of moving the object 160 each time is similar to, and may be understood by analogy by making reference to, the description of the above embodiment, and the description thereof is not repeated herein.

In an embodiment, the distance that the moving device 110 moves the object 160 each time may be a fixed distance, so that the three-dimension measurement device 400 scans the object 160 point by point to scan all three-dimension features of the object 160. In another embodiment, the distance that the moving device 110 moves the object 160 each time may be a fixed distance or a non-fixed distance, so that the three-dimension measurement device 400 scans the object 160 by the jump point manner to scan the height of the particular points of the object 160. In addition, the operation of the moving device 110 of the three-dimension measurement device 400 is similar to, and may be understood by analogy by making reference to, the description of the above embodiment, and the description thereof is not repeated herein.

In an embodiment, the number of phase images generated by the line-type image-capturing device 430 are associated with the size of the object 160. In addition, the description of the number of phase images associated with the size of the object 160 is similar to, and may be understood by analogy by making reference to, the description of the above embodiment, and the description thereof is not repeated herein.

Figure 5:
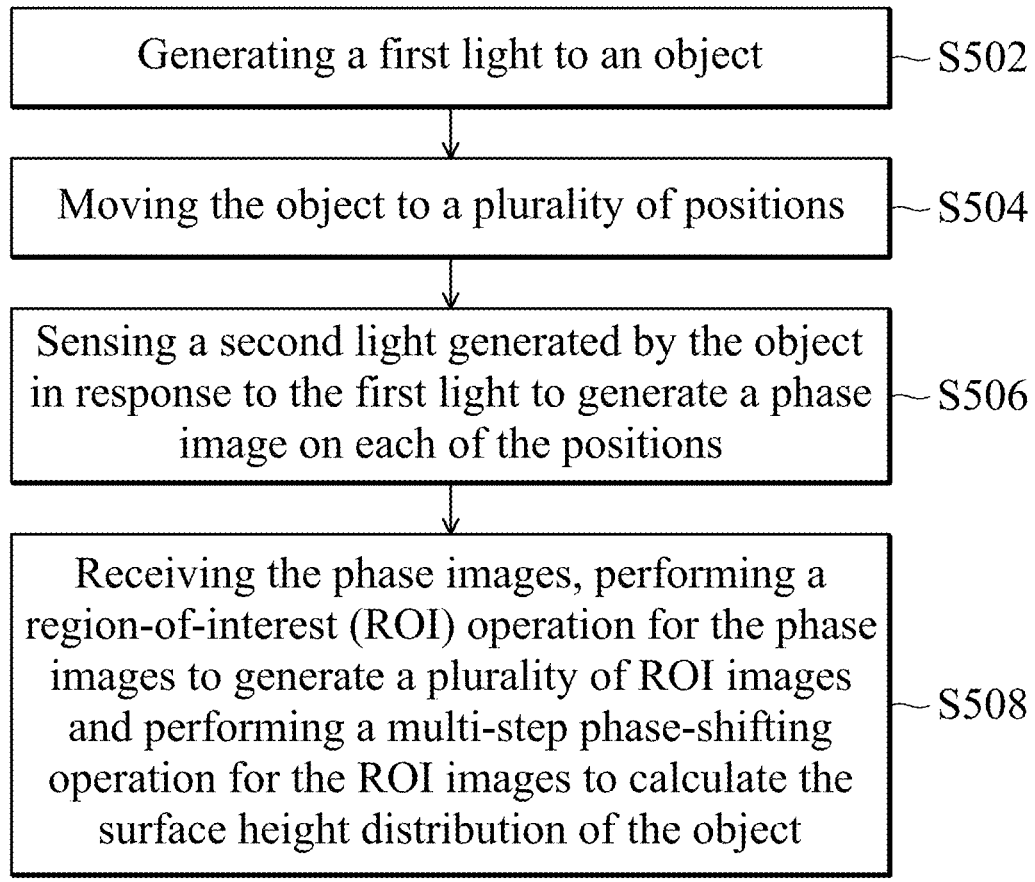
FIG. 5 is a flowchart of an operation method of a three-dimension measurement device according to an embodiment of the present disclosure.

FIG. 5 is a flowchart of an operation method of a three-dimension measurement device according to an embodiment of the present disclosure. In step S502, the method involves generating a first light to an object. In step S504, the method involves moving the object to a plurality of positions. In step S506, the method involves sensing a second light generated by the object in response to the first light to generate a phase image on each of the positions. In step S508, the method involves receiving the phase images, performing a region-of-interest (ROI) operation for the phase images to generate a plurality of ROI images and performing a multi-step phase-shifting operation for the ROI images to calculate the surface height distribution of the object.

In the embodiment, when the object is a specular object, the angle of the first light is equal to the angle of the second light, wherein the first light is an incident light and the second light is a reflected light. When the object is a non-specular object, the angle of the first light is not equal to the angle of the second light, wherein the first light is an incident light and the second light is a scattered light. A distance of moving the object each time is associated with the pixel size and the lens magnification of the image-capturing device. The number of phase images is associated with the size of the object.

FIG. 6 is a flowchart of an operation method of a three-dimension measurement device according to another embodiment of the present disclosure. In step S602, the method involves generating the first light to the object according to a light-adjustment condition, wherein the light-adjustment condition is adjusted according to the pixel size of the line-type image-capturing device, the pixel pitch of the line-type image-capturing device, the lens magnification of the line-type image-capturing device, the lens magnification of the projecting device, and the angle between the first light and the second light.

In step S604, the method involves moving the object to a plurality of positions. In step S606, the method involves sensing a second light generated by the object in response to the first light to generate a phase image on each of the positions. In step S608, the method involves receiving the phase images, performing a region-of-interest (ROI) operation for the phase images to generate a plurality of ROI images and performing a multi-step phase-shifting operation for the ROI images to calculate the surface height distribution of the object.

In the embodiment, when the object is a specular object, the angle of the first light is equal to the angle of the second light, wherein the first light is an incident light and the second light is a reflected light. When the object is a non-specular object, the angle of the first light is not equal to the angle of the second light, wherein the first light is an incident light and the second light is a scattered light. A distance of moving the object each time is associated with the pixel size and the lens magnification of the image-capturing device. The number of phase images is associated with the size of the object.

In summary, according to the three-dimension measurement device and the operation method thereof disclosed by the present disclosure, the first light is generated to the object, the object is moved to the plurality of positions, and the second light generated by the object in response to the first light is sensed to generate the phase image on each of the positions. Then, the phase images are received, the ROI operation is performed for the phase images to generate the ROI images, and the multi-step phase-shifting operation for the ROI images to calculate the surface height distribution of the object.

Furthermore, when the image-capturing device is the line-type image-capturing device, the projecting device may generate the first light according to the light-adjustment condition, wherein the light-adjustment condition is adjusted according to the pixel size of the line-type image-capturing device, the pixel pitch of the line-type image-capturing device, the lens magnification of the line-type image-capturing device, the lens magnification of the projecting device, and the angle between the first light and the second light. Accordingly, the second light generated by the object in response to the first light may correspond to the image-capturing phases of the line-type image-capturing device. Therefore, the influence of the phase error may be effectively decreased, and the accuracy and the speed of measuring the surface height distribution of the object 160 are increased.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A three-dimension measurement device, comprising:
    a moving device, configured to carry an object, and move the object to a plurality of positions;
    a projector, configured to generate a first light to the object;
    a surface-type camera, configured to sense a second light generated by the object in response to the first light to generate a phase image on each of the positions; and
    a processor, coupled to the surface-type camera, and configured to receive the phase images, perform a region-of-interest (ROI) operation for the phase images to generate a plurality of ROI images and perform a multi-step phase-shifting operation for the ROI images to calculate a surface height distribution of the object.

2. The three-dimension measurement device as claimed in claim 1, wherein an angle of the first light is equal to an angle of the second light, the first light is an incident light, and the second light is a reflected light.

3. The three-dimension measurement device as claimed in claim 1, wherein an angle of the first light is not equal to an angle of the second light, the first light is an incident light, and the second light is a scattered light.

4. The three-dimension measurement device as claimed in claim 1, wherein a distance that the moving device moves the object each time is associated with a pixel size and a lens magnification of the surface-type camera.

5. The three-dimension measurement device as claimed in claim 1, wherein the number of phase images is associated with a size of the object.

6. A three-dimension measurement device, comprising:
    a moving device, configured to carry an object, and move the object to a plurality of positions;
    a projector, configured to generate a first light to the object according to a light-adjustment condition;
    a line-type camera, configured to sense a second light generated by the object in response to the first light to generate a phase image on each of the positions; and
    a processor, coupled to the line-type camera, and configured to receive the phase images, perform a region-of-interest (ROI) operation for the phase images to generate a plurality of ROI images and perform a multi-step phase-shifting operation for the ROI images to calculate a surface height distribution of the object;
    wherein the light-adjustment condition is adjusted according to a pixel size of the line-type camera, a pixel pitch of the line-type camera, a lens magnification of the line-type camera, a lens magnification of the projector, and an angle between the first light and the second light.

7. The three-dimension measurement device as claimed in claim 6, wherein an angle of the first light is equal to an angle of the second light, the first light is an incident light, and the second light is a reflected light.

8. The three-dimension measurement device as claimed in claim 6, wherein an angle of the first light is not equal to an angle of the second light, the first light is an incident light, and the second light is a scattered light.

9. The three-dimension measurement device as claimed in claim 6, wherein a distance that the moving device moves the object each time is associated with a pixel size and a lens magnification of the line-type camera.

10. The three-dimension measurement device as claimed in claim 6, wherein the number of phase images are associated with a size of the object.

11. An operation method of a three-dimension measurement device, comprising:
    generating a first light to an object;
    moving the object to a plurality of positions;
    sensing a second light generated by the object in response to the first light to generate a phase image on each of the positions; and
    receiving the phase images, performing a region-of-interest (ROI) operation for the phase images to generate a plurality of ROI images and performing a multi-step phase-shifting operation for the ROI images to calculate a surface height distribution of the object.

12. The operation method of the three-dimension measurement device as claimed in claim 11, wherein an angle of the first light is equal to an angle of the second light, the first light is an incident light, and the second light is a reflected light.

13. The operation method of the three-dimension measurement device as claimed in claim 11, wherein an angle of the first light is not equal to an angle of the second light, the first light is an incident light, and the second light is a scattered light.

14. The operation method of the three-dimension measurement device as claimed in claim 11, wherein a distance that a moving device moves the object each time is associated with a pixel size and a lens magnification of a camera.

15. The operation method of the three-dimension measurement device as claimed in claim 11, wherein the number of phase images is associated with a size of the object.

16. The operation method of the three-dimension measurement device as claimed in claim 11, wherein the step of generating the first light to the object comprises:
   generating the first light to the object according to a light-adjustment condition; and
   wherein the light-adjustment condition is adjusted according to a pixel size of a line-type camera, a pixel pitch of the line-type camera, a lens magnification of the line-type camera, a lens magnification of a projector, and an angle between the first light and the second light.

* * * * *